(12) United States Patent
Nauheimer et al.

(10) Patent No.: US 12,404,839 B2
(45) Date of Patent: Sep. 2, 2025

(54) WIND TURBINE BLADE AND WIND TURBINE WITH A DOWN CONDUCTOR SPAR CAP

(71) Applicant: Siemens Gamesa Renewable Energy A/S, Brande (DK)

(72) Inventors: Michael Nauheimer, Aalborg (DK); Sri Markandeya Rajesh Ponnada, Boucherville (CA)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/922,391

(22) PCT Filed: May 3, 2021

(86) PCT No.: PCT/EP2021/061585
§ 371 (c)(1),
(2) Date: Oct. 31, 2022

(87) PCT Pub. No.: WO2021/228606
PCT Pub. Date: Nov. 18, 2021

(65) Prior Publication Data
US 2023/0349364 A1   Nov. 2, 2023

(30) Foreign Application Priority Data
May 14, 2020   (IN) .............................. 202031020283

(51) Int. Cl.
*F03D 80/30*   (2016.01)
*F03D 1/06*   (2006.01)

(52) U.S. Cl.
CPC ........... *F03D 80/30* (2016.05); *F03D 1/0675* (2013.01); *F03D 1/0679* (2023.08);
(Continued)

(58) Field of Classification Search
None
See application file for complete search history.

(56) References Cited

U.S. PATENT DOCUMENTS

| 6,457,943 B1* | 10/2002 | Olsen | F03D 80/30 |
| | | | 416/241 A |
| 7,494,324 B2* | 2/2009 | Hibbard | H02G 13/00 |
| | | | 416/241 A |

(Continued)

FOREIGN PATENT DOCUMENTS

| CN | 103797243 A | 5/2014 |
| CN | 205805824 U | 12/2016 |

(Continued)

OTHER PUBLICATIONS

English translation of WO2017/089591A1 (Year: 2017).*

(Continued)

*Primary Examiner* — Woody A Lee, Jr.
*Assistant Examiner* — Wesley Le Fisher
(74) *Attorney, Agent, or Firm* — Schmeiser, Olsen & Watts LLP

(57) ABSTRACT

A wind turbine blade for a wind turbine is provided, the wind turbine blade having a tip portion and a root portion, and the wind turbine blade including a shell and a spar, the spar including two spar caps connected to one another by at least one spar web of the spar and extending in a longitudinal direction of the wind turbine blade, whereby at least one of the two spar caps is configured as a main down conductor of a lightning protection system of the wind turbine blade, the at least one main down conductor including an electrically conductive fiber-reinforced plastic being electroconductively connected to at least one electrical interface of the lightning protection system. Also provided is a wind turbine including such a wind turbine blade.

16 Claims, 3 Drawing Sheets

(52) U.S. Cl.
CPC ......... *F03D 1/0681* (2023.08); *F03D 80/301* (2023.08); *F05B 2280/2006* (2013.01); *F05B 2280/6003* (2013.01)

(56) References Cited

U.S. PATENT DOCUMENTS

| | | | | |
|---|---|---|---|---|
| 7,729,100 | B2* | 6/2010 | Llorente Gonzalez | ...................... B82Y 30/00 361/220 |
| 8,118,559 | B2* | 2/2012 | Llorente Gonzalez | ...................... F03D 1/065 416/226 |
| 8,657,582 | B2* | 2/2014 | Hibbard | .................. F03D 80/30 416/229 R |
| 9,689,377 | B2* | 6/2017 | Klein | ...................... F03D 80/40 |
| 9,719,495 | B2* | 8/2017 | Chacon | .................. F03D 13/20 |
| 10,125,744 | B2* | 11/2018 | March Nomen | ....... F03D 80/30 |
| 10,294,925 | B2* | 5/2019 | Klein | ................... F03D 1/0675 |
| 10,330,075 | B2* | 6/2019 | March Nomen | ....... F03D 80/30 |
| 10,648,456 | B2* | 5/2020 | Shain | ...................... F03D 80/30 |
| 11,994,112 | B2* | 5/2024 | Hayden | .................. H02G 13/40 |
| 2007/0074892 | A1 | 4/2007 | Hibbard | |
| 2008/0073098 | A1* | 3/2008 | Llorente Gonzalez | ...................... B82Y 30/00 174/2 |
| 2012/0134826 | A1 | 5/2012 | Arocena De La Rua et al. | |
| 2014/0241896 | A1 | 8/2014 | Zhang et al. | |
| 2015/0292479 | A1 | 10/2015 | Ohlerich et al. | |
| 2016/0138569 | A1 | 5/2016 | Caruso et al. | |
| 2016/0327028 | A1 | 11/2016 | March Nomen et al. | |
| 2016/0333861 | A1* | 11/2016 | Chacon | .................... F03D 80/30 |
| 2018/0156202 | A1 | 6/2018 | Lipka et al. | |
| 2018/0245566 | A1* | 8/2018 | Sawada | ................. F03D 1/0675 |

FOREIGN PATENT DOCUMENTS

| | | | | |
|---|---|---|---|---|
| DE | 19748716 | C1 * | 11/1998 | ........... B64C 27/473 |
| EP | 2930355 | A1 | 10/2015 | |
| EP | 3 255 275 | A1 | 12/2017 | |
| EP | 3483424 | A1 | 5/2019 | |
| EP | 3501808 | A1 | 6/2019 | |
| EP | 3501809 | A1 | 6/2019 | |
| EP | 3501810 | A1 | 6/2019 | |
| EP | 3511560 | A1 | 7/2019 | |
| WO | 00/14405 | A1 | 3/2000 | |
| WO | WO-2017089591 | A1 * | 6/2017 | ........... F03D 1/0675 |
| WO | 2018/101632 | A1 | 6/2018 | |

OTHER PUBLICATIONS

English translation of DE19748716C1 (Year: 1998).*
International Search Report and Written Opinion for PCT/EP2021/061585 issued on Aug. 4, 2021.

* cited by examiner

WIND TURBINE BLADE AND WIND TURBINE WITH A DOWN CONDUCTOR SPAR CAP

CROSS-REFERENCE TO RELATED APPLICATIONS

This application claims priority to PCT Application No. PCT/EP2021/061585, having a filing date of May 3, 2021, which claims priority to Indian Application No. 202031020283, having a filing date of May 14, 2020, the entire contents both of which are hereby incorporated by reference.

FIELD OF TECHNOLOGY

The following relates to a wind turbine blade having an improved lightning protection system and a wind turbine having an improved lightning protection system.

BACKGROUND

Lightning is likely to strike wind turbines due to their exposed location and height. As lightning strikes may cause considerable damage to a wind turbine, wind turbines are typically protected by a lightning protection system. The objective of the lightning protection system is to prevent lightning from damaging the wind turbine blades, bearings and electrical systems of the wind turbine when a wind turbine blade intercepts a lightning strike.

In particular, the wind turbine blades of the wind turbines are susceptible to both interception of lightning strikes when they are at a pointer position of or near 12 o clock, i.e., showing up to the sky, and taking severe damage from lightning strikes. For this purpose, the wind turbine blades are provided with metallic down conductors as their main down conductors and part of their lightning protection system. The metallic down conductor is attached to a spar web of a spar of the wind turbine blade extending in a longitudinal direction of the wind turbine blade. Thereby, the metallic down conductor in the wind turbine blade extends from its tip to its root at which the wind turbine blade is attached to a hub of the wind turbine. The lightning protection system of the wind turbine further comprises down conductors running from the hub via the nacelle down to the tower, acting as a further down conductor to earth or having down conductors inside or outside of the tower and being grounded.

When the spar caps of the spar of the wind turbine blade having the metallic down conductor comprise or are made from electrically conductive fiber-reinforced polymer equipotential bonds between the spar caps and the metallic down conductor need to be provided. For example, carbon-fiber-reinforced plastic is increasingly used in the spar caps due to its high stiffness-to-mass ratio, thereby enhancing the performance of the wind turbine blades. The equipotential bonds in spar caps employing an electroconductive fiber-reinforced plastic are necessary to ensure that a voltage difference due to a current flow from a lightning strike through the spar caps or the metallic down-conductor with respect to the metallic down conductor is under a certain threshold for preventing a flashover, which may lead to structural damage of the wind turbine blade.

Further, such equipotential bonds typically go through high-strain regions of the wind turbine blade and thus the spar caps cannot be electroconductively connected to the metallic down conductor in a straight manner. Thereby, the equipotential bonds reduce the design flexibility of the wind turbine blades.

Moreover, the metal-conductive fiber interface between the electrically conductive fiber-reinforced plastic and the metallic down conductor can form a galvanic couple, thereby possibly leading to corrosion. Also, impedance difference between the plastic, such as carbon, and the metal of the metallic down conductor, such as copper, leads to a high risk of delamination of the spar caps, due to the high current flow resulting from the lightning strike.

Also, the equipotential bonds are typically manufactured manually, and their manufacturing quality may thus vary. However, manufacturing defects are difficult to detect, and accessing and repairing them in the installed wind turbine is very complex.

Ultimately, all equipotential bonds and the metallic down conductor add weight and material costs as well as manufacturing costs and time to the manufacturing process of the wind turbine blade. Also, the attachment of the metallic down conductor in the wind turbine blade, typically at the spar web of the spar, poses further manufacturing steps, additional material and risk of defects.

SUMMARY

An aspect relates to a wind turbine blade having an improved lightning protection system not having the disadvantages from the state of the art, whereby in particular the wind turbine blade may be manufactured with less manufacturing steps, material and costs and still provide the necessary lightning protection capabilities to avoid damage due to lightning strikes.

Thereby, the features and details described in connection with the wind turbine blade of embodiments of the invention apply in connection with the wind turbine, so that regarding the disclosure of the individual aspects of embodiments of the invention it is or can be referred to one another.

According to a first aspect of embodiments of the invention, the object is solved by a wind turbine blade for a wind turbine, the wind turbine blade having a tip portion and a root portion, and the wind turbine blade comprising a shell and a spar, the spar comprising two spar caps connected to one another by at least one spar web of the spar and extending in a longitudinal direction of the wind turbine blade, whereby at least one of the two spar caps is configured as a main down conductor of a lightning protection system of the wind turbine blade, the at least one main down conductor comprising an electrically conductive fiber-reinforced plastic being electroconductively connected to at least one electrical interface of the lightning protection system.

The wind turbine blade according to the first aspect of embodiments of the invention lets go of the solution of a metallic down conductor as a main down conductor of its lightning protection system as known in the state of the art. Instead, at least one of the two spar caps of the spar comprising electrically conductive fiber-reinforced plastic is configured as the main down conductor. The electroconductive properties of the material of the spar cap and its large surface area are thereby favorably utilized for conducting current flow from an intercepted lightning strike. Thereby, the usage of electrically conductive fiber-reinforced plastic in the spar caps accepted as a disadvantage over usage of non-electroconductive fiber-reinforced plastic in the spar caps in the state of the art, i.e., resulting in the necessity of equipotential bonds with the metallic down conductor possibly resulting in corrosion, defects and high manufacturing costs and time, is turned into an advantage. There are no equipotential bonds of a metal-conductive fiber type with a metallic down conductor anymore and hereby the risk of corrosion is eliminated, and the risk of defects and the costs of manufacturing are significantly decreased.

It may be preferred that the at least one main down conductor is configured to mainly conduct electricity from a lightning strike from the tip portion to the root portion of the wind turbine blade. According to this feature, when both spar caps are configured as main down conductors, both main down conductors are configured to mainly conduct electricity from a lightning strike from the tip portion to the root portion of the wind turbine blade. Mainly means that more than half of the current of an intercepted lightning strike is conducted via the at least one main down conductor being the at least one spar cap. This may typically not be achieved when a metallic down conductor is provided over the length of the wind turbine blade, because the electroconductivity of the metallic down conductor will in most if not all cases be greater than the electroconductivity of electrically conductive fiber-reinforced plastic of the spar caps. In particular, the at least one main down conductor may be configured to entirely or substantially entirely conduct electricity from a lightning strike from the tip portion to the root portion of the wind turbine blade.

It may also be preferred, that the electrically conductive fiber-reinforced plastic of the at least one main down conductor is electroconductively connected to a first electrical interface at the tip portion and electroconductively connected to a second electrical interface at the root portion. The first electrical interface and the second electrical interface are of the at least one electrical interface of the lightning protection system. Thereby, the at least one main down conductor extends from the tip portion to the root portion and is fully integrated into the lightning protection system.

Therein, it may be preferred that the first electrical interface is an electrical air-termination arrangement and/or the second electrical interface is an electrical root terminal. The air-termination arrangement may in particular comprise an air-termination base and at least one or multiple air-terminations mounted on the air-termination base. The root terminal may be an electrical terminal at the root of the wind turbine blade for electroconductive connection to the hub of the wind turbine. The electrical air-termination arrangement may be arranged at the tip or in a tip portion of the wind turbine blade. Also, there may be at least one further or multiple first electrical interfaces electroconductively connected to the electrically conductive fiber-reinforced plastic of the main down conductor. The at least one further or the multiple first electrical interfaces may be further electrical air-termination arrangements. The electrical air-termination arrangement may intercept a lightning strike at the tip portion of the wind turbine blade. The electrical root terminal may be electroconductively connected to the lightning protection system of the wind turbine, in particular at its hub.

It may also be preferred that each of the two spar caps is configured as a main down conductor comprising an electrically conductive fiber-reinforced plastic being electroconductively connected to the at least one electrical interface of the lightning protection system. Thereby, the electroconductive properties of both spar caps are favorably used for the purpose of conducting current from a lightning strike.

Moreover, it may be preferred that the at least one main down conductor predominantly comprises or is made from electrically conductive fiber-reinforced plastic. Thereby, its electroconductive properties are enhanced.

Also, it may be preferred that the electrically conductive fiber-reinforced plastic of the at least one main down conductor is carbon-fiber-reinforced plastic. Carbon-fiber-reinforced plastic provides for particularly good electrically conductivity and has a favorable stiffness-to-mass ratio for employment in the spar caps. The electrically conductive fiber-reinforced plastic may be further reinforced with at least one other material that may or may not be in the form of a fiber. This material may have high electroconductive properties and/or high mechanical strength and/or stiffness to improve electrical and/or mechanical properties of the spar caps and thereby the wind turbine blade.

Further, it may be preferred, that the two spar caps are connected by at least one equipotential bond connection arranged in between the tip portion and the root portion. The equipotential bond connection reduces the risk of flashovers from one spar cap to the other one and thereby the risk of structural damage to the spar caps due to lightning strikes.

Therein, it may be preferred that multiple equipotential bond connections connect the two spar caps in between the tip portion and the root portion, whereby the multiple equipotential bond connections are arranged at distance from one another along the longitudinal direction of the wind turbine blade. Thereby, the risk of flashovers is further reduced. This may be possible by having less equipotential bond connections than equipotential bonds in the state of the art, because the distance between the spar caps is greater compared to the distance between a spar cap and the metallic down conductor as known in the state of the art.

Therein, it may further be preferred that the at least one equipotential bond connection predominantly comprises or is made from electrically conductive fiber-reinforced plastic. In particular, the electrically conductive fiber-reinforced plastic of the equipotential bond connection may be the same as the electrically conductive fiber-reinforced plastic of the at least one main down conductor. Thereby, an electrically conductive fiber reinforced plastic—electrically conductive fiber reinforced plastic interface is provided. Such an interface is easier to manufacture than the metal-conductive fiber interface for the equipotential bonds as known in the state of the art and does not have the disadvantages, such as risk of corrosion and/or impedence mismatch associated therewith.

Also, it may be preferred that the at least one electrical interface predominantly comprises metal or is made from metal. For example, copper or a metal alloy having copper may be used as the metal. Thereby, at the at least one electrical interface, a particularly high electrical conductivity is provided to conduct the current from the lightning strike.

Further, it may be preferred that the at least one electrical interface is electroconductively connected to the electrically conductive fiber-reinforced plastic of the at least one main down conductor by a metallic conductor connection predominantly comprising metal or being made from metal. For example, copper or a metal alloy having copper may be used as the metal. Thereby, at the connection between the at least one main down conductor and the at least one electrical interface, a particularly high electrical conductivity is provided to conduct the current from the lightning strike.

In particular, it may be preferred that a longitudinal portion of the wind turbine blade in between the tip portion and the root portion and in between the two spar caps does not comprise a metallic down conductor predominantly comprising or being made from metal. Thereby, the disadvantages associated with integration of a metallic down conductor in the lightning protection system of the wind turbine blade are avoided.

Also, it may be preferred that the spar web or the wind turbine blade does not comprise a metallic down conductor predominantly comprising metal or being made from metal. In particular, the spar web or the wind turbine blade may not comprise a further down conductor besides the one or two of the two spar caps configured as main down conductors. In other words, the one or two of the two spar caps configured as main down conductors may be the only down conductors of the wind turbine blade. Thereby, the disadvantages associated with integration of a metallic down conductor in the lightning protection system of the wind turbine blade are avoided.

According to a second aspect of embodiments of the invention, the aspect is solved by a wind turbine comprising at least one wind turbine blade according to the first aspect of embodiments of the invention, whereby the lightning protection system of the at least one wind turbine blade is electroconductively connected to a lightning protection system of the wind turbine.

Further advantages, features and details of embodiments of the invention unfold from the following description, in which by reference to the drawings an embodiment of the state of the art and an embodiment of the present invention are described in detail. Thereby, the features from the claims as well as the features mentioned in the description can be essential for the invention as taken alone or in an arbitrary combination.

BRIEF DESCRIPTION

Some of the embodiments will be described in detail, with reference to the following figures, wherein like designations denote like members, wherein.

Same objects in FIGS. 1 to 6 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

DETAILED DESCRIPTION

Figure 1:
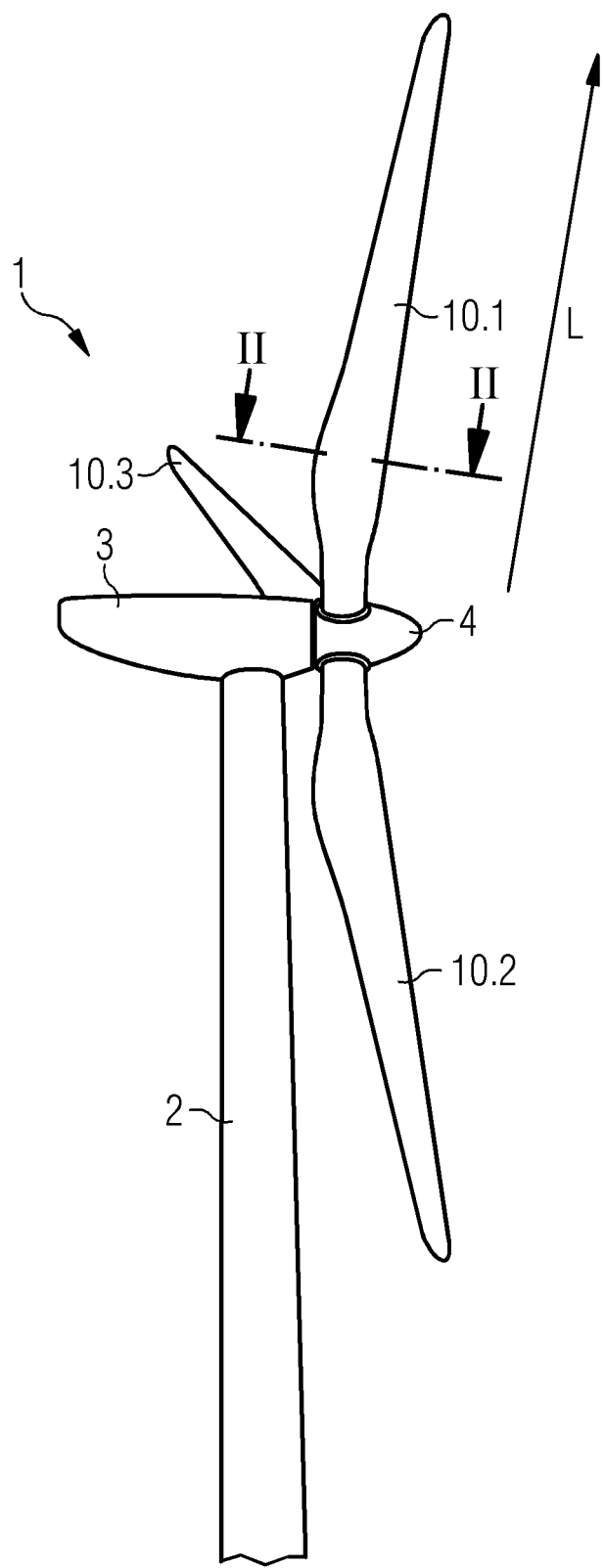
FIG. 1 shows a side perspective view on an embodiment of a wind turbine.

The wind turbine 1 as shown in FIG. 1 comprises a tower 2, a nacelle 3 and a hub 4. The nacelle 3 is supported on the tower 2 and the hub 4 is attached to the nacelle 3. In this exemplary case, three wind turbine blades 10.1, 10.2, 10.3 are attached to the hub 4. However, the number of wind turbine blades 10 may alternatively be less or more than three. As exemplary shown for the wind turbine blade 10.1, the wind turbine blade 10.1 extends in a longitudinal direction L from a root portion 15 to a tip portion 14 thereof. The features of the wind turbine 1 as mentioned above may be employed in a wind turbine 1 according to embodiments of the invention.

The wind turbine blade 10.1 of the wind turbine 1 of FIG. 1 is cut along line II-II. The sectional cut along line II-II for a wind turbine blade 10 according to an embodiment of the state of the art is illustrated in FIG. 2.

The wind turbine blade 10 comprises a shell 11 and a spar. The spar comprises two spar caps 12.1, 12.2 located opposite of one another and being connected to each other by a spar web 13. With the above-mentioned features, the wind turbine blade 10 shown in FIG. 2 may be the same as one according to an embodiment of the invention. However, different from such an embodiment of the invention, the wind turbine blade 10 as shown in FIG. 2 comprise a metallic down conductor 20 as a main down conductor. The metallic down conductor 20 is attached to the spar web 13 and runs in the longitudinal direction L of the wind turbine blade 10 from its tip portion 14 to its root portion 15.

Figure 2:
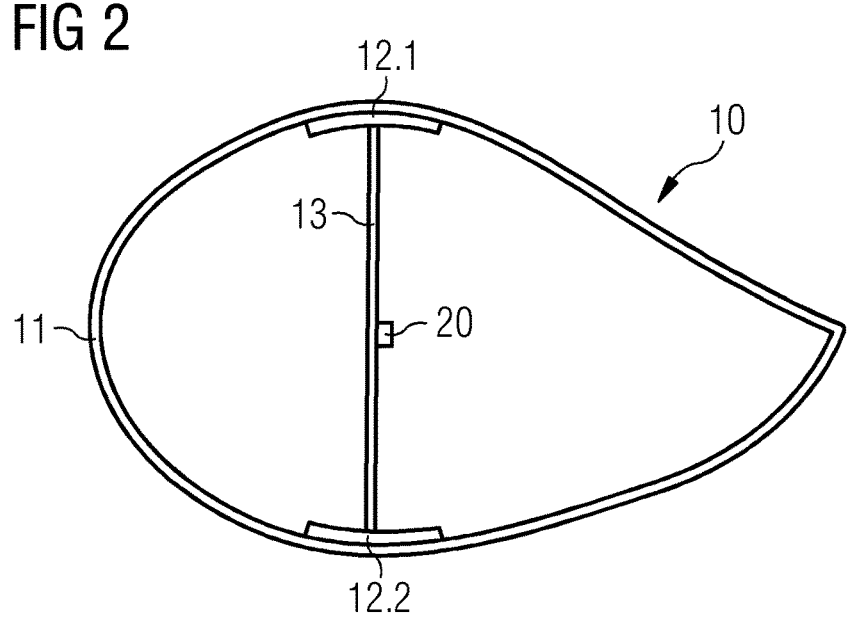
FIG. 2 shows a sectional cut through a wind turbine blade of the wind turbine of FIG. 1 and according to an embodiment of the state of the art.
Figure 3:
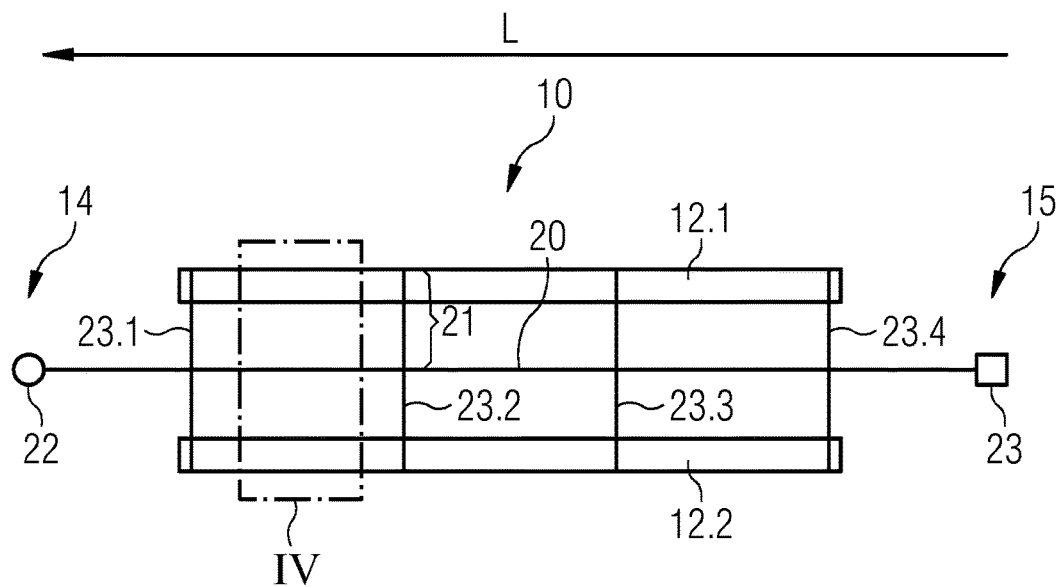
FIG. 3 shows a schematic view on the lightning protection system of the wind turbine blade of FIG. 2.

FIG. 3 shows a schematic view on the lightning protection system of the wind turbine blade 10 of FIG. 2. The spar caps 12.1, 12.2 are made from an electrically conductive fiber-reinforced plastic. The metallic down conductor 20 extends in the longitudinal direction L of the blade and is connected to a first electrical interface 22 at the tip portion 14 of the wind turbine blade 10 and to a second electrical interface 23 at the root portion 15 of the wind turbine blade 10. Equipotential bond connections 21, one of which is exemplary denominated, are provided with distance from one another along the wind turbine blade 10 to prevent flashovers F when current from a lightning strike flows through the spar caps 12.1, 12.2 and the metallic down conductor 20. The equipotential bond connections 21 are formed by multiple metallic connectors extending transverse, in particular substantially perpendicular, to the metallic down conductor 20.

Figure 4:
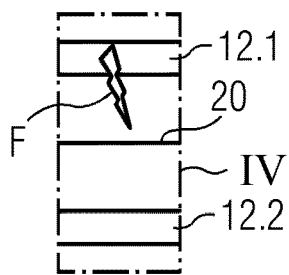
FIG. 4 shows a flashover in the wind turbine blade of FIG. 3.

A cut-out III from FIG. 3 is shown in detail in FIG. 4, where a flashover F occurs in between the spar cap 12.1 and the metallic down conductor 20. This may occur when the number of equipotential bond connections 21 is low and the current from the lightning strike is very strong. This may lead to structural damage of the wind turbine blade 10 and must be prevented by providing an adequate, high number of equipotential bond connections 21. However, these equipotential bond connections 21 are of a metal-conductive fiber type and thereby lead to several disadvantages such as reduced design flexibility of the wind turbine blades, possibly corrosion at the metal-conductive fiber interface, delamination in or around the spar caps and manufacturing defects as explained in detail in the introductory part of this specification.

Figure 5:
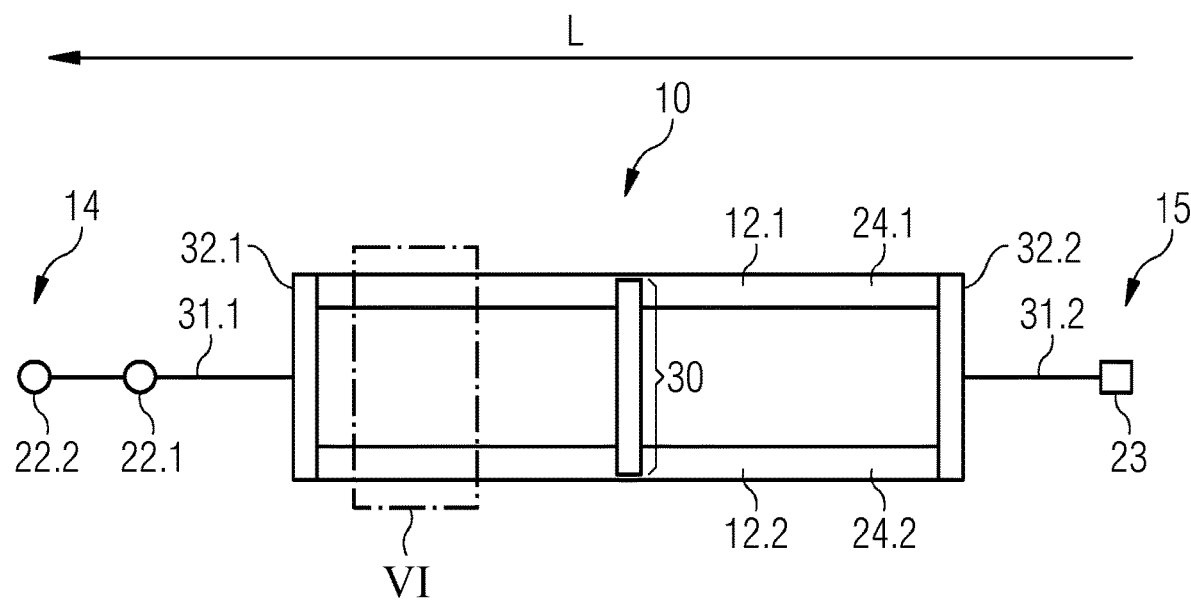
FIG. 5 shows a schematic view on the lightning protection system of a wind turbine blade according to an embodiment of the invention.

As shown in the lightning protection system of the wind turbine blade 10 according to an embodiment of the invention in FIG. 5, the metallic down conductor 20 is omitted. Instead, the spar caps 12.1, 12.2 are utilized as main down conductors 24.1, 24.2. The main down conductors 24.1, 24.2 are the only down conductors of the wind turbine blade 10. At the tip portion 14 of the wind turbine blade 10, the main down conductors 24.1, 24.2 are connected to at least one first electrical interface, in this particular case two first electrical interfaces 22.1, 22.2, via a first metallic conductor connection 31.1. In this case, the first electrical interfaces 22.1, 22.2 are provided as electrical air-terminations 22.1, 22.2 of an electrical air-termination arrangement 22 in the tip portion 14 of the wind turbine blade 10. At the root portion 15 of the wind turbine blade 10, the main down conductors 24.1, 24.2 are connected to a second electrical interfaces 23 via a second metallic conductor connection 31.2. In this case, the second electrical interface 23 is provided as an electrical root terminal 23. Thus, the lightning protection system of the wind turbine blade 10 comprises a first segment as a first metallic conductor connection 31.1, a second segment as the spar caps 12.1, 12.2 configured as main down conductors 24.1, 24.2 and a third segment configured as a second metallic conductor connection 31.2. The first segment is connected to the second segment by a connection of the first metallic conductor connection 31.1 with an electrically conductive fiber connection 32.1 between the first spar cap 12.1 and the second spar cap 12.2. The second segment is connected to the third segment by a connection of the second metallic conductor connection 31.2 with an electrically conductive fiber connection 32.2 between the first spar cap 12.1 and the second spar cap 12.2. Instead of the electrically conductive fiber connections 32.1, 32.2, the first segment and the second segment may be directly connected to each of the first spar cap 12.1 and the second spar cap 12.2. The electrically conductive fiber-connections 32.1, 32.2 form a plastic-plastic connection with the spar caps 12.1, 12.2. The material used for the electrically conductive fiber-connections 32.1, 32.2 may be a fiber-reinforced plastic, in particular the same fiber-reinforced plastic as used for the spar caps 12.1, 12.2, for example carbon-fiber-reinforced plastic. At the first segment, being at the tip portion 14 of the wind turbine blade 10, and at the third segment, being at the root portion 15 of the wind turbine blade 10, a particularly high electrical conductivity is provided for favorably carrying the current from the lightning strike to the spar caps 12.1, 12.2 and away from the spar caps 12.1, 12.2.

In order to prevent flashovers F from occurring when a lightning strike is intercepted by one of the electrical air-terminations 22.1, 22.2, equipotential bond connections 30 may be provided in between the spar caps 12.1, 12.2. In FIG. 5, one equipotential bond connection 30 is shown, however, the number of the equipotential bond connections 30 may be adjusted as needed. Different from the equipotential bond connections 21 of the wind turbine blade 10 of FIG. 3, the equipotential bond connections 30 employed in the wind turbine blade 10 of FIG. 5 do have a plastic-plastic or conductive fiber-conductive fiber interface and thereby do not show the disadvantages associated with the metal-conductive fiber interface present in the wind turbine blade 10 of FIG. 3. The material used for the equipotential bond connection 30 may be a fiber-reinforced plastic, in particular the same fiber-reinforced plastic as used for the spar caps 12.1, 12.2, for example carbon-fiber-reinforced plastic. Alternatively, the equipotential bond connections 30 may employ metal together with electroconductive fiber-reinforced plastic, which may be provided as flaps or extensions connecting the spar caps 12.1, 12.2 with the metal, for example.

Figure 6:
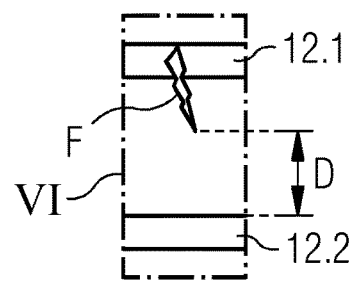
FIG. 6 shows absence of flashover in the wind turbine blade of FIG. 5.

Moreover, the number of equipotential bond connections 30 employed in the wind turbine blade 10 of FIG. 5 may be less than in the wind turbine blade 10 of FIGS. 3 and 4. This is explained with reference to the cut-out IV of FIG. 5, which is shown in detail in FIG. 6. FIG. 6 shows a flashover F, which may occur in the wind turbine blade 10 of FIG. 5, from a lightning strike of same strength as in FIG. 4. However, different from FIG. 4, in FIG. 5 there is no metallic down conductor 20 but the spar cap 12.2 as the further main down conductor 24.2. The two main down conductors 24.1, 24.2 are separated from one another by a further distance D compared to the wind turbine blade 10 of FIGS. 3 and 4, where the metallic down conductor 20 is closer to the spar cap 12.1. Thereby, the flashover F would have to be larger, i.e., bridge a greater distance between electroconductive objects, in order to discharge itself and possibly damage the wind turbine blade 10. Due to the increased distance D, the likelihood of flashovers F and structural damage is decreased and hence the number of equipotential bond connections 30 may be less, effectively resulting in less material, weight, manufacturing costs and time.

When the wind turbine blade 10 has a tapering geometry in the tip portion 14, it may be provided that the spar caps 12.1 and 12.2 extend to join each other, thereby avoiding the need for equipotential connection 32.1. Thus, such a tapered wind turbine blade 10 with joining spar caps 12.1, 12.2 at its tip portion 14 may omit the equipotential connection 32.2 at the tip portion 14.

Also, the first metallic conductor connection 31.1 may be omitted when the first segment is omitted. Alternatively, the first metallic conductor connection 31.1 may be transverse to the longitudinal direction L, i.e., in the chordwise direction of the wind turbine blade 10.

Further, it is also possible that in the root portion 15 of the blade 10, the third segment may comprise more than one metallic down-conductor 31.2 connected to the root terminal 23, in particular two or more metallic down-conductors 31.2. Similarly, the first segment may comprise more than one metallic down-conductor connection 31.1.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade for a wind turbine, the wind turbine blade comprising:
   a tip portion;
   a root portion;
   a shell;
   a spar comprising two spar caps connected to one another by at least one spar web of the spar and extending in a longitudinal direction of the wind turbine blade, wherein, at least one of the two spar caps is configured as a main down conductor of a lightning protection system of the wind turbine blade, the at least one main down conductor comprising an electrically conductive fiber-reinforced plastic being electroconductively connected to at least one electrical interface of the lightning protection system, wherein the at least one electrical interface comprises a first electrical interface at the tip portion and a second electrical interface at the root portion;
   wherein the two spar caps are connected by a first equipotential bond connection and a second equipotential bond connection;
   wherein a first metallic conductor connection connects the first electrical interface to the first equipotential bond connection, and a second metallic conductor connection connects the second equipotential bond connection to the second electrical interface at the root portion;
   wherein the first equipotential bond connection and the second equipotential bond connection connect the two spar caps without contacting a metal down conductor arranged between the two spar caps along a thickness direction.

2. The wind turbine blade according to claim 1, wherein, the at least one main down conductor is configured to mainly conduct electricity from a lightning strike from the tip portion to the root portion of the wind turbine blade.

3. The wind turbine blade according to claim 1, wherein, the first electrical interface is an electrical air-termination arrangement and/or the second electrical interface is an electrical root terminal.

4. The wind turbine blade according to claim 1, wherein, each of the two spar caps is configured as a main down conductor comprising an electrically conductive fiber-reinforced plastic being electroconductively connected to the at least one electrical interface of the lightning protection system.

5. The wind turbine blade according to claim 1, wherein, the at least one main down conductor comprises or is made from electrically conductive fiber-reinforced plastic.

6. The wind turbine blade according to claim 1, wherein, the electrically conductive fiber-reinforced plastic of the at least one main down conductor is carbon-fiber-reinforced plastic.

7. The wind turbine blade according to claim 1, wherein the first equipotential bond connection and the second equipotential bond connection are arranged in between the two spar caps.

8. The wind turbine blade according to claim 7, wherein, multiple equipotential bond connections connect the two spar caps in between the tip portion and the root portion, whereby the multiple equipotential bond connections are arranged at a distance from one another along the longitudinal direction of the wind turbine blade.

9. The wind turbine blade according to claim 7, wherein, the first equipotential bond connection and the second equipotential bond connection comprises or is made from electrically conductive fiber-reinforced plastic.

10. The wind turbine blade according to claim 1, wherein the at least one electrical interface comprises metal or is made from metal.

11. The wind turbine blade according to claim 1, wherein, the at least one electrical interface is electroconductively connected to the electrically conductive fiber-reinforced plastic of the at least one main down conductor by a metallic conductor connection comprising metal or being made from metal.

12. The wind turbine blade according to claim 1, wherein, a longitudinal portion of the wind turbine blade in between the tip portion and the root portion and in between the two spar caps does not comprise a metallic down conductor comprising or being made from metal.

13. The wind turbine blade according to claim 1, wherein the at least one spar web or the wind turbine blade does not comprise a metallic down conductor comprising metal or being made from metal.

14. A wind turbine comprising at least one wind turbine blade according to claim 1, wherein the lightning protection system of the at least one wind turbine blade is electroconductively connected to a lightning protection system of the wind turbine.

15. The wind turbine blade according to claim 1, wherein the two spar caps are the only down conductors of the wind turbine blade.

16. The wind turbine blade according to claim 1, wherein the wind turbine blade does not comprise a metallic down conductor arranged between the two spar caps between the tip and the root of the wind turbine blade.

* * * * *